(12) United States Patent
Xu (10) Patent No.: US 10,210,630 B2
(45) Date of Patent: Feb. 19, 2019

(54) PICTURE COMPRESSION METHOD AND APPARATUS, AND MOBILE TERMINAL

(71) Applicant: BEIJING KINGSOFT INTERNET SECURITY SOFTWARE CO., LTD., Beijing (CN)

(72) Inventor: Ming Xu, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 0 days.

(21) Appl. No.: 15/754,453

(22) PCT Filed: Aug. 31, 2016

(86) PCT No.: PCT/CN2016/097701
§ 371 (c)(1),
(2) Date: Feb. 22, 2018

(87) PCT Pub. No.: WO2017/050105
PCT Pub. Date: Mar. 30, 2017

(65) Prior Publication Data
US 2018/0374241 A1    Dec. 27, 2018

(30) Foreign Application Priority Data

Sep. 23, 2015  (CN) .......................... 2015 1 0614213

(51) Int. Cl.
*G06T 3/40*  (2006.01)
*G06T 9/00*  (2006.01)
(Continued)

(52) U.S. Cl.
CPC ................ *G06T 9/00* (2013.01); *G06T 3/40* (2013.01); *G06T 7/60* (2013.01); *G09G 5/005* (2013.01); *G09G 5/39* (2013.01); *G09G 2340/02* (2013.01)

(58) Field of Classification Search
CPC .................................. G06T 3/40; G09G 5/005
See application file for complete search history.

(56) References Cited

U.S. PATENT DOCUMENTS

2008/0291221 A1*  11/2008  Yamada .................... G06F 3/14
                                                          345/660
2014/0055497 A1   2/2014  Mok
(Continued)

FOREIGN PATENT DOCUMENTS

CN          102044058         5/2011
CN          103366341         10/2013
(Continued)

OTHER PUBLICATIONS

WIPO, ISR/WO for PCT/CN2016/097701, dated Nov. 30, 2016.

*Primary Examiner* — Ryan R Yang
(74) *Attorney, Agent, or Firm* — Hodgson Russ LLP (57) ABSTRACT

The present disclosure provides a method and an apparatus for compressing an image and a mobile terminal. The method includes: obtaining a height of an image to be compressed and a pixel density of a mobile terminal in which the image to be compressed stored; when the height of the image to be compressed is greater than or equal to a preset threshold and the pixel density is greater than or equal to a preset pixel density, further obtaining a display height of the mobile terminal and calculating a first height of the image to be compressed according to the display height and the pixel density of the mobile terminal; and determining a compression height for compressing the image to be compressed according to the preset threshold and the first height.

15 Claims, 5 Drawing Sheets

(51) Int. Cl.
*G06T 7/60* (2017.01)
*G09G 5/39* (2006.01)
*G09G 5/00* (2006.01)

(56) References Cited

U.S. PATENT DOCUMENTS

2014/0240361 A1* 8/2014 Liu ................... G06T 3/4092
345/660
2016/0086585 A1* 3/2016 Sugimoto ............. G09G 5/391
345/668

FOREIGN PATENT DOCUMENTS

| CN | 103399802 | 11/2013 |
| CN | 103905643 | 7/2014 |
| CN | 104679466 | 6/2015 |
| CN | 104732486 | 6/2015 |
| CN | 105261050 | 1/2016 |
| EP | 2670126 | 12/2013 |

* cited by examiner

PICTURE COMPRESSION METHOD AND APPARATUS, AND MOBILE TERMINAL

CROSS-REFERENCE TO RELATED APPLICATION

This application is a U.S. national phase application of International Application No. PCT/CN2016/097701, filed Aug. 31, 2016, which claims priority to and benefits of Chinese Patent Application Serial No. 201510614213.8, filed with the State Intellectual Property Office of P. R. China on Sep. 23, 2015, the entire content of which is incorporated herein by reference.

FIELD

The present disclosure relates a mobile terminal technical field, and more particularly, to a method and an apparatus for compressing an image and a mobile terminal.

BACKGROUND

With the development of science and technology, performance of mobile phones is significantly improved and more and more images are stored in mobile phones. The images may come from various sources, such as photographs taken by a user through the mobile phone, webpage images, images generated by a social software, etc. With an increasing amount of images, a lot of memory space of the mobile phone may be occupied. How to reduce a memory usage of an image while maintain quality of the image is a technical problem to be solved.

Currently, cropping or compression is usually used to reduce memory space occupied by the image.

However, it may reduce clarity of the image when the image is displayed in a mobile phone with a high pixel density to crop the image with a unified height, for example 1024 pixels; while when a height of the image is less than the unified height, the image may be stretched and the clarity thereof may get worse; it may lose data and reduce the clarity of the image to compress the image with a unified size, for example 200 kb (kilobyte).

SUMMARY

Embodiments of the present disclosure provide a method for compressing an image, including obtaining a height of an image to be compressed and a pixel density of a mobile terminal in which the image to be compressed stored; when the height of the image to be compressed is greater than or equal to a preset threshold and the pixel density is greater than or equal to a preset pixel density, further obtaining a display height of the mobile terminal and calculating a first height of the image to be compressed according to the display height and the pixel density of the mobile terminal; and determining a compression height for compressing the image to be compressed according to the preset threshold and the first height.

Embodiments of the present disclosure provide a mobile terminal, including a housing, a processor, a memory, a circuit board and a power source circuit, in which, the circuit board is arranged inside a space surrounded by the housing, the processor and the memory are set on the circuit board; the power source circuit is configured to provide power for each circuit or device of the mobile terminal; the memory is configured to store executable program codes; the processor is configured to read the executable program codes stored in the memory to execute a program corresponding to the executable program codes so as to perform acts of: obtaining a height of an image to be compressed and a pixel density of a mobile terminal in which the image to be compressed stored; when the height of the image to be compressed is greater than or equal to a preset threshold and the pixel density is greater than or equal to a preset pixel density, further obtaining a display height of the mobile terminal and calculating a first height of the image to be compressed according to the display height and the pixel density of the mobile terminal; and determining a compression height for compressing the image to be compressed according to the preset threshold and the first height.

Embodiments of the present disclosure provide a non-transitory computer-readable storage medium, stored with instructions that when executed by a processor of a terminal, causing the terminal to perform the above method for compressing an image.

Embodiments of the present disclosure provide a computer program that when executed by a processor, performing the above method for compressing an image.

Additional aspects and advantages of embodiments of the present disclosure will be given in part in the following descriptions, become apparent in part from the following descriptions, or be learned from the practice of the embodiments of the present disclosure.

DETAILED DESCRIPTION

Reference will now be made in detail to embodiments of the present disclosure, examples of which are illustrated in the accompanying drawings, wherein the same or similar elements and the elements having same or similar functions are denoted by like reference numerals throughout the descriptions. Embodiments described herein with reference to the accompanying drawings are explanatory and used to generally understand the present disclosure, and shall not be construed to limit the present disclosure.

The method for compressing an image, the apparatus for compressing an image and the mobile terminal according to embodiments of the present disclosure will be described below with reference to the accompanying drawings.

Figure 1:
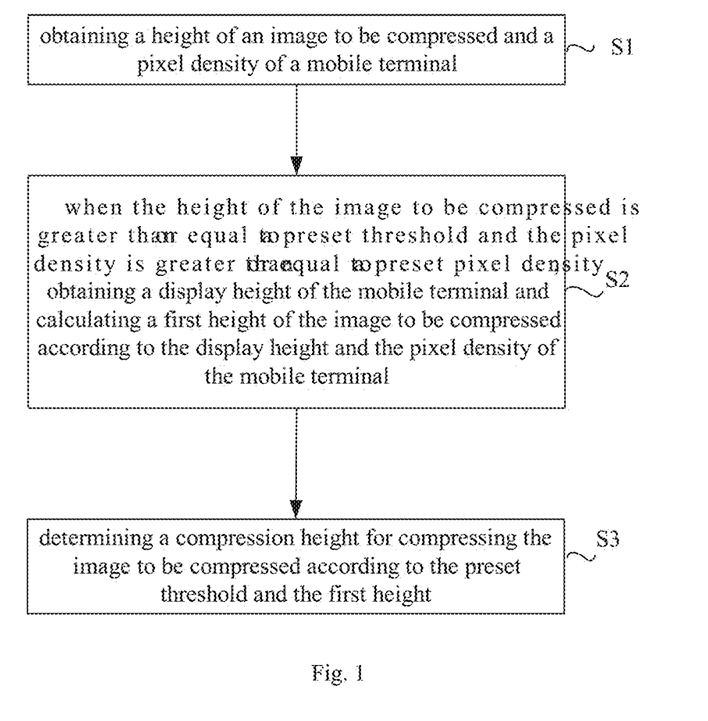
FIG. 1 is a flow chart of a method for compressing an image according to an embodiment of the present disclosure.

FIG. 1 is a flow chart of a method for compressing an image according to an embodiment of the present disclosure. As illustrated in FIG. 1, the method includes following acts.

At block S1, a height of an image to be compressed and a pixel density of a mobile terminal in which the image to be compressed stored are obtained.

In detail, the image to be compressed may be expressed by resolution, for example, the resolution of the image is 1024*768, and the height thereof is 1024 pixels. While the pixel density may be expressed by PPI, i.e. pixels per inch, and the pixel density of the mobile terminal may be calculated by $PPI=\sqrt{x^2+y^2}/z$, where x represents the width (pixels), y represents the height (pixels) and z represents a size of a screen of the mobile terminal. For example, for a mobile terminal with a 5-inch screen, a width of 1080 pixels and a height of 1920 pixels, the pixel density (in PPI) is 441 pixels per inch.

At block S2, when the height of the image to be compressed is greater than or equal to a preset threshold and the pixel density is greater than or equal to a preset pixel density, a display height of the mobile terminal is further obtained and a first height of the image to be compressed is calculated according to the display height and the pixel density of the mobile terminal.

In detail, the preset threshold may be 1024 pixels and the preset pixel density may be 300 pixels per inch. When the pixel density of the mobile terminal is greater than 300 pixels per inch, pixel grains cannot be distinguished by human eyes; when the pixel density of the mobile terminal is less than 300 pixels per inch, the pixel grains can be distinguished by human eyes, which means that the image is not clear enough.

In detail, a first ratio of the preset pixel density to the pixel density of the mobile terminal may be calculated, and then a product of the first ratio and the display height of the mobile terminal is taken as the first height.

For example, when the height of the image to be compressed is 3000 pixels, which is greater than the preset threshold of 1024 pixels, it means that the image needs to be compressed. While a resolution of the mobile terminal is 1920*1080, and the pixel density is 386 PPI. The first height of the image to be compressed may be 300/386*1920=1492 pixels.

At block S3, a compression height for compressing the image to be compressed is determined according to the preset threshold and the first height.

In detail, block S3 may include following acts.

At block S31, it is determined whether the first height is less than the preset threshold.

At block S32, when the first height is less than the preset threshold, the preset threshold is taken as the compression height, and the image to be compressed is compressed accordingly.

In detail, when the first height is less than the preset threshold, i. e. 1024 pixels, it means that if the image is compressed with the first height, data of the image may be lost and thus leading to unclarity. Therefore the preset threshold, i. e. 1024 pixels, may be taken as the compression height, and the image to be compressed is compressed accordingly.

At block S33, when the first height is greater than or equal to the preset threshold, it is further determined whether the height of the image to be compressed is greater than or equal to the first height.

At block S34, when the height of the image to be compressed is greater than or equal to the first height, the first height is taken as the compression height, and the image to be compressed is compressed accordingly.

For example, the height of the image to be compressed is 3000 pixels, which is greater than the first height of 1492 pixels, and then the compression height of the image to be compressed may be determined as 1492 pixels.

When the height of the image to be compressed is less than the first height, the image to be compressed is not compressed.

In addition, when the compression height of the image to be compressed is determined, a compression width may be determined according to the compression height. In detail, a width of the image to be compressed may be obtained and a second ratio of the compression height to the height of the image to be compressed is calculated, and then a product of the second ratio and the width of the image to be compressed is taken as the compression width. For example, assuming that the resolution of the image to be compressed is 1920*1080 in pixels, and the compression height determined accordingly is 1942 pixels, it is obtained 1492/1920=0.77. Then the compression width is calculated as 0.77*1080=831 pixels. After that, the image to the compressed may be compressed to 1492*831 in pixels.

It should be understood that, in embodiments of the present disclosure with the term "height" of the image to be compressed, no matter the image is lateral or longitudinal, a longer side of the image is considered as the height of the image to be compressed.

When compressing images with the method of the present embodiment, according to a statistic result of experiment data, a time for compressing each image is 0.75 s, and each image may be compressed to 6.78% of its original size, and 93.22% of the storage space for each image may be saved on average.

With the method for compressing an image according to embodiments of the present disclosure, by obtaining the display height and the pixel density of the mobile terminal to calculate the first height of the image to be compressed, and comparing the first height to the preset threshold or the height of the image to be compressed, a suitable compression height may be determined to compress the image to be compressed, thus reducing storage space occupied by the image while guaranteeing clarity of the image as well.

Figure 2:
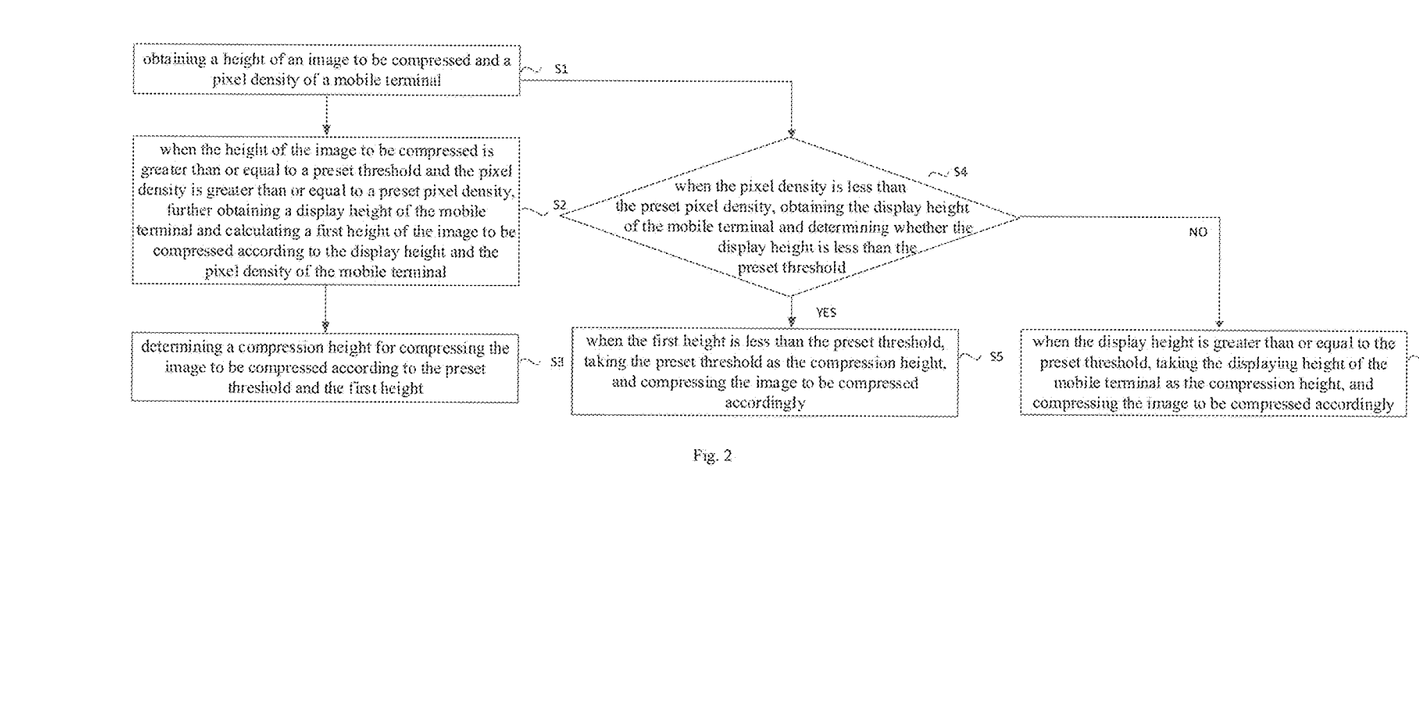
FIG. 2 is a flow chart of a method for compressing an image according to another embodiment of the present disclosure.

FIG. 2 is a flow chart of a method for compressing an image according to another embodiment of the present disclosure. As illustrated in FIG. 2, the method includes following acts.

At block S1, a height of an image to be compressed and a pixel density of a mobile terminal are obtained.

At block S2, when the height of the image to be compressed is greater than or equal to a preset threshold and the pixel density is greater than or equal to a preset pixel density, a display height of the mobile terminal is further obtained and a first height of the image to be compressed is calculated according to the display height and the pixel density of the mobile terminal.

At block S3, a compression height for compressing the image to be compressed is determined according to the preset threshold and the first height.

Block S1 to S3 in this embodiment is similar to which described in the above embodiment, thus will not be elaborated.

At block S4, when the pixel density is less than the preset pixel density, the display height of the mobile terminal is further obtained and it is determined whether the display height is less than the preset threshold.

After the pixel density of the mobile terminal is obtained at block S1, if the pixel density is less than the preset pixel density, then the display height of the mobile terminal is further obtained and it is determined whether the display height is less than the preset threshold, i.e. 1024 pixels.

At block S5, when the display height is less than the preset threshold, the preset threshold is taken as the compression height, and the image to be compressed is compressed accordingly.

At block S6, when the display height is greater than or equal to the preset threshold, the display height of the mobile terminal is taken as the compression height, and the image to be compressed is compressed accordingly.

In addition, when the compression height of the image to be compressed is determined, a compression width may be determined according to the compression height. In detail, a width of the image to be compressed may be obtained and a second ratio of the compression height to the height of the image to be compressed is calculated, and then a product of the second ratio and the width of the image to be compressed is taken as the compression width. For example, assuming that the resolution of the image to be compressed is 1920*1080 in pixels, and the compression height determined accordingly is 1942 pixels, it is obtained 1492/1920=0.77. Then the compression width is calculated as 0.77*1080=831 pixels. After that, the image to the compressed may be compressed to 1492*831 in pixels.

It should be understood that, in embodiments of the present disclosure with the term "height" of the image to be compressed, no matter the image is lateral or longitudinal, a longer side of the image is considered as the height of the image to be compressed.

With the method for compressing an image according to embodiments of the present disclosure, by obtaining the display height and the pixel density of the mobile terminal, and comparing the display height of the mobile terminal to the preset threshold when the pixel density is less than the preset pixel density, a suitable compression height may be determined to compress the image to be compressed, thus reducing storage space occupied by the image while guaranteeing clarity of the image as well.

Figure 3:
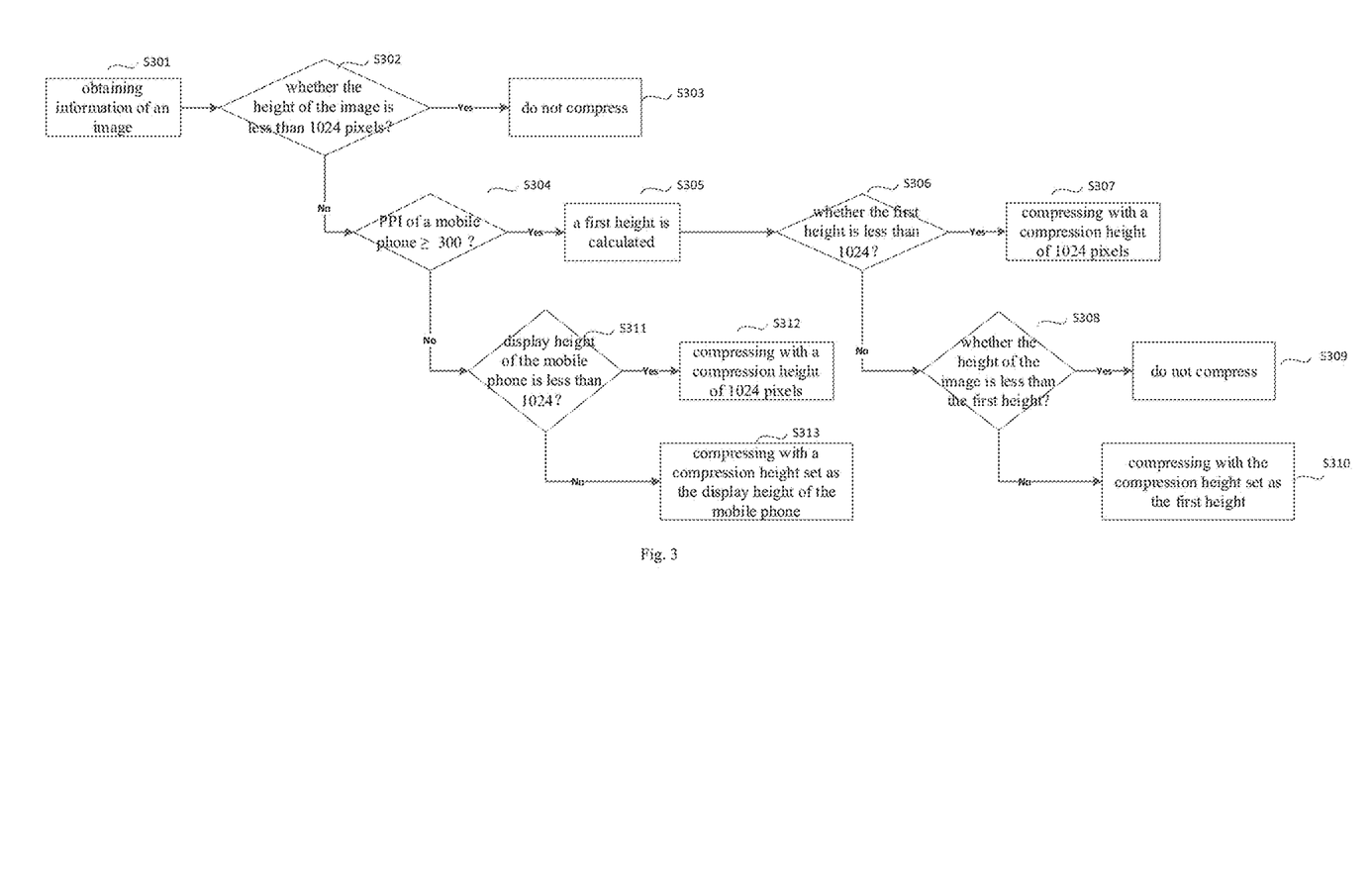
FIG. 3 is a flow chart of a method for compressing an image according to a detailed embodiment of the present disclosure.

FIG. 3 is a flow chart of a method for compressing an image according to a detailed embodiment of the present disclosure. As illustrated in FIG. 3, the method includes following acts.

At block S301, information of an image is obtained.

For example, it may be obtained that the resolution of the image is 1024*768, then the height of the image is 1024 pixels and the width of the image is 768 pixels.

At block S302, it is determined whether the height of the image is less than 1024 pixels.

At block S303, when the height of the image is less than 1024 pixels, the image is not compressed.

At block S304, when the height of the image is greater than 1024 pixels, it is further determined whether a PPI of a mobile phone is greater than 300 pixels per inch.

At block S305, when the PPI of the mobile phone is greater than 300 pixels per inch, a first height is calculated.

At block S306, it is determined whether the first height is less than 1024 pixels.

At block S307, when the first height is less than 1024 pixels, the image is compressed with a compression height of 1024 pixels.

At block S308, when the first height is greater than 1024 pixels, it is further determined whether the height of the image is less than the first height.

At block S309, when the height of the image is less than the first height, the image is not compressed.

At block S310, when the height of the image is greater than the first height, the image is compressed with the compression height set as the first height.

At block S311, when the PPI of the mobile phone is less than 300 pixels per inch, it is further determined whether a display height of the mobile phone is less than 1024 pixels.

At block S312, when the display height is less than 1024 pixels, the image is compressed with a compression height of 1024 pixels.

At block S313, when the display height is greater than 1024 pixels, the image is compressed with a compression height set as the display height of the mobile phone.

It should be understood that when the compression height is determined, a corresponding compression width of the image may be of the same compressing ratio as the compression height.

With the method for compressing an image according to embodiments of the present disclosure, by obtaining the information of the image and the display information of the mobile terminal, a suitable compression height may be determined according to the information of the image and the display information of the mobile terminal, and the image to be compressed is compressed accordingly, thus reducing storage space occupied by the image while guaranteeing clarity of the image as well.

To achieve the above embodiments, the present disclosure also provides an apparatus for compressing an image.

Figure 4:
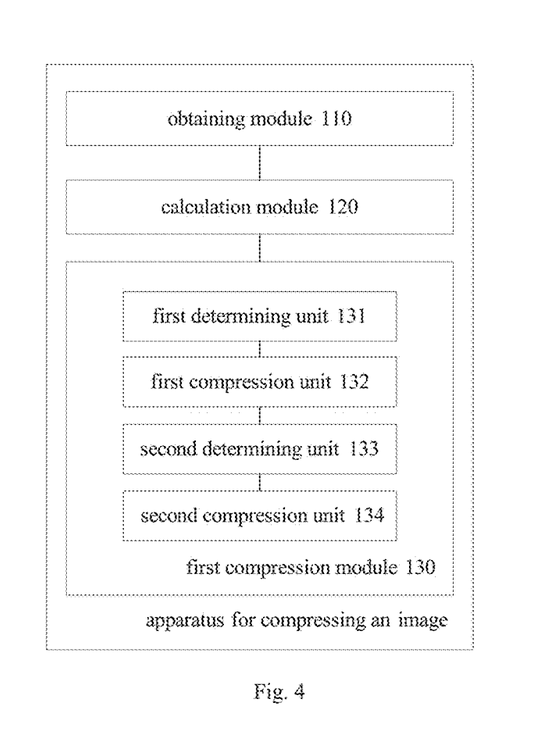
FIG. 4 is a first block diagram of an apparatus for compressing an image according to an embodiment of the present disclosure.

FIG. 4 is a first block diagram of an apparatus for compressing an image according to an embodiment of the present disclosure. As illustrated in FIG. 4, the apparatus may include an obtaining module 110, a calculation module 120 and a first compression module 130.

The obtaining module 110 is configured to obtain a height of an image to be compressed and a pixel density of a mobile terminal in which the image to be compressed stored.

In detail, the image to be compressed may be expressed by resolution, for example, the resolution of the image is 1024*768, and the height thereof is 1024 pixels. While the pixel density may be expressed by PPI, i.e. pixels per inch, and the pixel density of the mobile terminal may be calculated by $$PPI = \frac{\sqrt{x^2 + y^2}}{z},$$

where x represents the width (pixels), y represents the height (pixels), and z represents a size of a screen of the mobile terminal. For example, for a mobile terminal with a 5-inch screen, a width of 1080 pixels and a height of 1920 pixels, the pixel density (in PPI) is 441 pixels per inch.

The calculation module 120 is configured to further obtain a display height of the mobile terminal when the height of the image to be compressed is greater than or equal to a preset threshold and the pixel density is greater than or equal to a preset pixel density, and to calculate a first height of the image to be compressed according to the display height and the pixel density of the mobile terminal.

In detail, the preset threshold may be 1024 pixels and the preset pixel density may be 300 pixels per inch. When the pixel density of the mobile terminal is greater than 300 pixels per inch, pixel grains cannot be distinguished by human eyes; when the pixel density of the mobile terminal is less than 300 pixels per inch, the pixel grains can be distinguished by human eyes, which means that the image is not clear enough.

In detail, the calculation module 120 may calculate a first ratio of the preset pixel density to the pixel density of the mobile terminal, and take a product of the first ratio and the display height of the mobile terminal as the first height.

For example, when the height of the image to be compressed is 3000 pixels, which is greater than the preset threshold of 1024 pixels, it means that the image needs to be compressed. While a resolution of the mobile terminal is 1920*1080, and the pixel density is 386 PPI. The first height of the image to be compressed may be 300/386*1920=1492 pixels.

The first compression module 130 is configured to determine a compression height for compressing the image to be compressed according to the preset threshold and the first height. In detail, the first compression module 130 may further include a first determining unit 131, a first compression unit 132, a second determining unit 133 and a second compression unit 134.

The first determining unit 131 is configured to determine whether the first height is less than the preset threshold.

The first compression unit 132 is configured to take the preset threshold as the compression height when the first height is less than the preset threshold, and to compress the image to be compressed accordingly.

In detail, when the first height is less than the preset threshold, i. e. 1024 pixels, it means that if the image is compressed with the first height, data of the image may be lost and thus leading to unclarity. Therefore the preset threshold, i. e. 1024 pixels, may be taken as the compression height, and the image to be compressed is compressed accordingly.

The second determining unit 133 is configured to further determine whether the height of the image to be compressed is greater than or equal to the first height when the first height is greater than or equal to the preset threshold.

The second compression unit 134 is configured to take the first height as the compression height when the height of the image to be compressed is greater than or equal to the first height, and to compress the image to be compressed accordingly.

For example, the height of the image to be compressed is 3000 pixels, which is greater than the first height of 1492 pixels, and then the compression height of the image to be compressed may be determined as 1492 pixels.

When the height of the image to be compressed is less than the first height, the image to be compressed is not compressed.

It should be understood that, in embodiments of the present disclosure with the term "height" of the image to be compressed, no matter the image is lateral or longitudinal, a longer side of the image is considered as the height of the image to be compressed.

When compressing images with the method of the present embodiment, according to a statistic result of experiment data, a time for compressing each image is 0.75 s, and each image may be compressed to 6.78% of its original size, and 93.22% of the storage space for each image may be saved on average.

Figure 5:
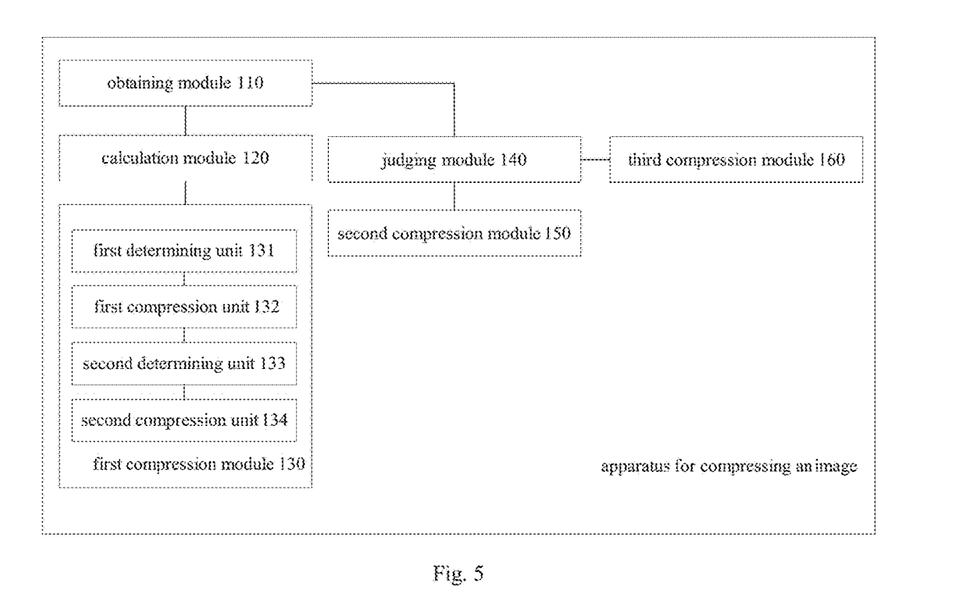
FIG. 5 is a second block diagram of an apparatus for compressing an image according to an embodiment of the present disclosure.

In addition, as illustrated in FIG. 5, the apparatus for compressing an image according to embodiments of the present disclosure may further include a judging module 140, a second compression module 150 and a third compression module 160.

The judging module 140 is configured to obtain the display height of the mobile terminal when the pixel density of the mobile terminal is less than the preset pixel density, and to determine whether the display height is less than the preset threshold.

After the pixel density of the mobile terminal is obtained, if the pixel density is less than the preset pixel density, then the display height of the mobile terminal is further obtained and it is determined whether the display height is less than the preset threshold, i.e. 1024 pixels.

The second compression module 150 is configured to take the preset threshold as the compression height when the display height is less than the preset threshold, and to compress the image to be compressed accordingly.

The third compression module 160 is configured to take the display height of the mobile terminal as the compression height when the display height is greater than or equal to the preset threshold, and to compress the image to be compressed accordingly.

Figure 6:
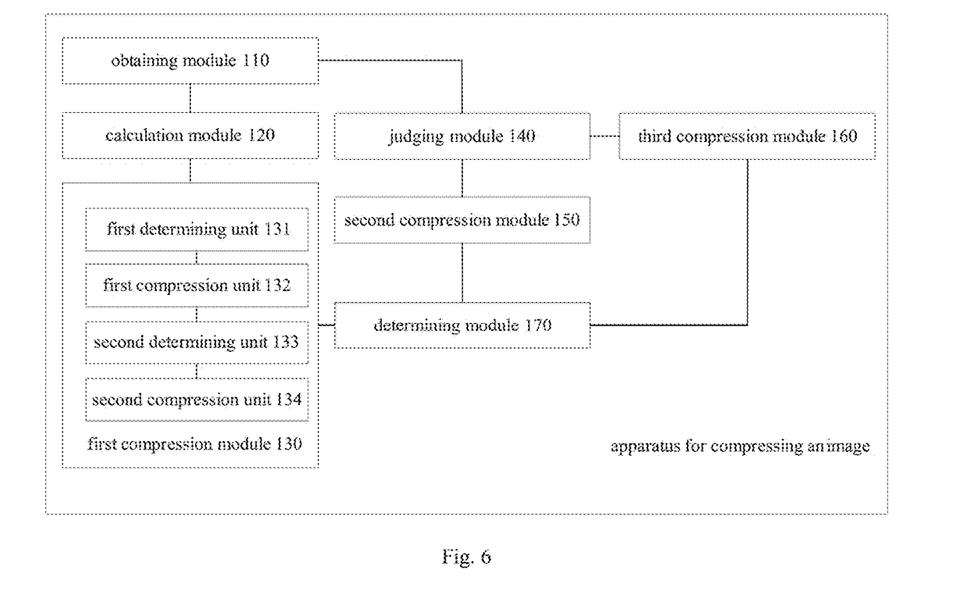
FIG. 6 is a third block diagram of an apparatus for compressing an image according to an embodiment of the present disclosure.

In addition, as illustrated in FIG. 6, the apparatus for compressing an image according to embodiments of the present disclosure may further include a determining module 170.

The determining module 170 is configured to determine a compression width according to the compression height after the compression height of the image to be compressed is determined and before the image to be compressed is compressed.

In detail, a width of the image to be compressed may be obtained and a second ratio of the compression height to the height of the image to be compressed is calculated, and then a product of the second ratio and the width of the image to be compressed is taken as the compression width. For example, assuming that the resolution of the image to be compressed is 1920*1080 in pixels, and the compression height determined accordingly is 1942 pixels, it is obtained 1492/1920=0.77. Then the compression height is calculated as 0.77*1080=831 pixels. After that, the image to the compressed may be compressed to 1492*831 in pixels.

With the apparatus for compressing an image according to embodiments of the present disclosure, by obtaining the display height and the pixel density of the mobile terminal to calculate the first height of the image to be compressed and comparing the first height to the preset threshold or the height of the image to be compressed, a suitable compression height may be determined to compress the image, thus reducing storage space occupied by the image while guaranteeing clarity of the image as well.

Figure 7:
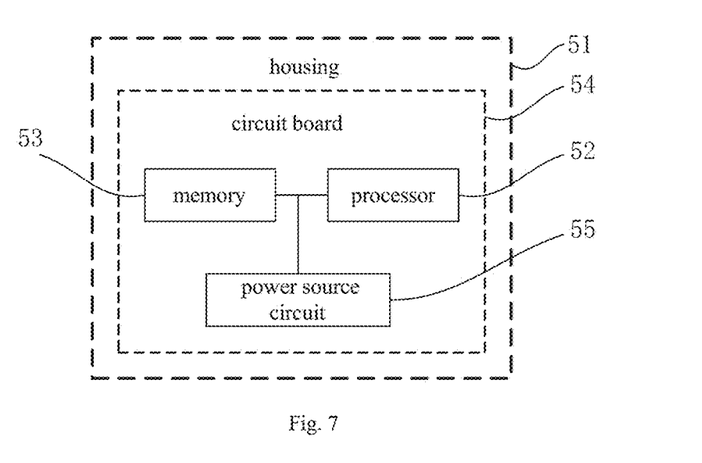
FIG. 7 is a block diagram of a mobile terminal according to an embodiment of the present disclosure.

Embodiments of the present disclosure also provide a client device, such as a mobile terminal. FIG. 7 is a block diagram of a mobile terminal according to an embodiment of the present disclosure. The mobile terminal includes a housing 51, a processor 52, a memory 53, a circuit board 54 and a power source circuit 55. The circuit board 54 is arranged inside a space surrounded by the housing 51, the processor 52 and the memory 53 are set on the circuit board 54; the power source circuit 55 is configured to provide power for each circuit or device of the mobile terminal; the memory 53 is configured to store executable program codes; the processor 52 is configured to read the executable program codes stored in the memory 53 to execute a program corresponding to the executable program codes so as to perform following acts.

In act S1', a height of an image to be compressed and a pixel density of a mobile terminal in which the image to be compressed stored are obtained.

In detail, the image to be compressed may be expressed by resolution, for example, the resolution of the image is 1024*768, and the height thereof is 1024 pixels. While the pixel density may be expressed by PPI, i.e. pixels per inch, and the pixel density of the mobile terminal may be calculated by $$PPI = \frac{\sqrt{x^2 + y^2}}{z},$$

where x represents the width (pixels), y represents the height (pixels) and z represents a size of a screen of the mobile terminal. For example, for a mobile terminal with a 5-inch screen, a width of 1080 pixels and a height of 1920 pixels, the pixel density (in PPI) is 441 pixels per inch.

In act S2', when the height of the image to be compressed is greater than or equal to a preset threshold and the pixel density is greater than or equal to a preset pixel density, a display height of the mobile terminal is further obtained and a first height of the image to be compressed is calculated according to the display height and the pixel density of the mobile terminal.

In detail, the preset threshold may be 1024 pixels and the preset pixel density may be 300 pixels per inch. When the pixel density of the mobile terminal is greater than 300 pixels per inch, pixel grains cannot be distinguished by human eyes; when the pixel density of the mobile terminal is less than 300 pixels per inch, the pixel grains can be distinguished by human eyes, which means that the image is not clear enough.

In detail, a first ratio of the preset pixel density to the pixel density of the mobile terminal may be calculated, and then a product of the first ratio and the display height of the mobile terminal is taken as the first height.

For example, when the height of the image to be compressed is 3000 pixels, which is greater than the preset threshold of 1024 pixels, it means that the image needs to be compressed. While a resolution of the mobile terminal is 1920*1080, and the pixel density is 386 PPI. The first height of the image to be compressed may be 300/386*1920=1492 pixels.

In act S3', a compression height for compressing the image to be compressed is determined according to the preset threshold and the first height.

In detail, act S3' may include following acts.

In act S31', it is determined whether the first height is less than the preset threshold.

In act S32', when the first height is less than the preset threshold, the preset threshold is taken as the compression height, and the image to be compressed is compressed accordingly.

In detail, when the first height is less than the preset threshold, i. e. 1024 pixels, it means that if the image is compressed with the first height, data of the image may be lost and thus leading to unclarity. Therefore the preset threshold, i. e. 1024 pixels, may be taken as the compression height, and the image to be compressed is compressed accordingly.

In act S33', when the first height is greater than or equal to the preset threshold, it is further determined whether the height of the image to be compressed is greater than or equal to the first height.

In act S34', when the height of the image to be compressed is greater than or equal to the first height, the first height is taken as the compression height, and the image to be compressed is compressed accordingly.

For example, the height of the image to be compressed is 3000 pixels, which is greater than the first height of 1492 pixels, and then the compression height of the image to be compressed may be determined as 1492 pixels.

When the height of the image to be compressed is less than the first height, the image to be compressed is not compressed.

In addition, when the compression height of the image to be compressed is determined, a compression width may be determined according to the compression height. In detail, a width of the image to be compressed may be obtained and a second ratio of the compression height to the height of the image to be compressed is calculated, and then a product of the second ratio and the width of the image to be compressed is taken as the compression width. For example, assuming that the resolution of the image to be compressed is 1920*1080 in pixels, and the compression height determined accordingly is 1942 pixels, it is obtained 1492/1920=0.77. Then the compression width is calculated as 0.77*1080=831 pixels. After that, the image to the compressed may be compressed to 1492*831 in pixels.

It should be understood that, in embodiments of the present disclosure with the term "height" of the image to be compressed, no matter the image is lateral or longitudinal, a longer side of the image is considered as the height of the image to be compressed.

When compressing images with the method of the present embodiment, according to a statistic result of experiment data, a time for compressing each image is 0.75 s, and each image may be compressed to 6.78% of its original size, and 93.22% of the storage space for each image may be saved on average.

The mobile terminal may be of various types, including but not limited to followings.

(1) A mobile communication device: this kind of device may have a mobile communication function and focus on providing voice and data communication. This kind of terminal may include a smart phone (for example, an iPhone), a multimedia mobile phone, a functional mobile phone or a low-level mobile phone.

(2) An ultra-mobile personal computer device: this kind of device may belong to a field of personal computer, have computation and processing functions, and generally have mobile Internet connection characteristic. This kind of terminal may include a PDA (Personal Digital Assistant), a MID (Mobile Internet Device) or a UMPC (Ultra-mobile Personal Computer) device, for example an iPad.

(3) A portable entertainment device: this kind of device may display and play multimedia content. This kind of terminal may include an audio and video player (for example, an iPod), a hand-held game console, an E-book reader, a smart toy and a portable vehicle on-board navigation device.

(4) A server: the server may provide a computation service, and may include a processor, a hardware, a memory, a system bus, etc. The server has a similar architecture as a common computer, but has a high standard on processing ability, stability, reliability, security, expandability, and manageability for proving a more reliable service.

(5) Other electronic devices having a data interactive function.

With the mobile terminal according to embodiments of the present disclosure, by obtaining the display height and the pixel density of the mobile terminal to calculate the first height of the image to be compressed, and comparing the first height to the preset threshold or the height of the image to be compressed, a suitable compression height may be determined to compress the image to be compressed, thus reducing storage space occupied by the image while guaranteeing clarity of the image as well.

In addition, embodiments according to the present disclosure provide a storage medium, stored with an application program that when executed, performing the method for compressing an image according to embodiments of the present disclosure. In detail, the method for compressing an image according to embodiments of the present disclosure may include:

obtaining a height of an image to be compressed and a pixel density of a mobile terminal in which the image to be compressed stored; when the height of the image to be compressed is greater than or equal to a preset threshold and the pixel density is greater than or equal to a preset pixel density, further obtaining a display height of the mobile terminal and calculating a first height of the image to be compressed according to the display height and the pixel density of the mobile terminal; and determining a compression height for compressing the image to be compressed according to the preset threshold and the first height.

In addition, embodiments according to the present disclosure provide an application program that when executed, performing the method for compressing an image according to embodiments of the present disclosure. In detail, the method for compressing an image according to embodiments of the present disclosure may include:

obtaining a height of an image to be compressed and a pixel density of a mobile terminal in which the image to be compressed stored; when the height of the image to be compressed is greater than or equal to a preset threshold and the pixel density is greater than or equal to a preset pixel density, further obtaining a display height of the mobile terminal and calculating a first height of the image to be compressed according to the display height and the pixel density of the mobile terminal; and determining a compression height for compressing the image to be compressed according to the preset threshold and the first height.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial," and "circumferential" refer to the directions and location relations which are the directions and location relations shown in the drawings, and for describing the present disclosure and for describing in simple, and which are not intended to indicate or imply that the device or the elements are disposed to locate at the specific directions or are structured and performed in the specific directions, which could not to be understood to the limitation of the present disclosure.

In addition, terms such as "first" and "second" are used herein only for purposes of description and are not intended to indicate or imply relative importance or significance or to imply the number of indicated technical features. Thus, the feature defined with "first" and "second" may comprise one or more of this feature either in a way of imply or indicate. In the description of the present disclosure, "a plurality of" means two or more than two, for example two, three, etc., unless specifically and particularly prescribed otherwise.

In the present invention, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements, or interactions of two elements, unless specified otherwise. The particular meanings of above terms can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature. While a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. In addition, those skilled in the art could combine or associate different embodiments, examples or characters of different embodiments or examples, as long as there are no contradictories.

Although embodiments of present disclosure have been illustrated and described above, it should be understood that above embodiments are just explanatory, and cannot be construed to limit the present disclosure, for those skilled in the art, changes, alternatives, and modifications can be made in the embodiments without departing from spirit, principles, and scope of the present disclosure.

What is claimed is:

1. A method for compressing an image, comprising:
   obtaining a height of an image to be compressed and a pixel density of a mobile terminal in which the image to be compressed stored;
   when the height of the image to be compressed is greater than or equal to a preset threshold and the pixel density is greater than or equal to a preset pixel density, further obtaining a display height of the mobile terminal and calculating a first height of the image to be compressed according to the display height and the pixel density of the mobile terminal; and
   determining a compression height for compressing the image to be compressed according to the preset threshold and the first height;
   wherein, determining a compression height for compressing the image to be compressed according to the preset threshold and the first height comprises:
   determining whether the first height is less than the preset threshold;
   when the first height is less than the preset threshold, taking the preset threshold as the compression height, and compressing the image to be compressed accordingly;

when the first height is greater than or equal to the preset threshold, further determining whether the height of the image to be compressed is greater than or equal to the first height; and when the height of the image to be compressed is greater than or equal to the first height, taking the first height as the compression height, and compressing the image to be compressed accordingly.

2. The method according to claim 1, wherein, after obtaining a pixel density of a mobile terminal, further comprising:

when the pixel density is less than the preset pixel density, obtaining the display height of the mobile terminal and determining whether the display height is less than the preset threshold;

when the display height is less than the preset threshold, taking the preset threshold as the compression height, and compressing the image to be compressed accordingly; and when the display height is greater than or equal to the preset threshold, taking the display height of the mobile terminal as the compression height, and compressing the image to be compressed accordingly.

3. The method according to claim 1, wherein, calculating a first height of the image to be compressed according to the display height and the pixel density of the mobile terminal comprises:

calculating a first ratio of the preset pixel density to the pixel density of the mobile terminal; and taking a product of the first ratio and the display height of the mobile terminal as the first height.

4. The method according to claim 1, wherein, after determining the compression height and before compressing the image to be compressed, further comprising:

determining a compression width according to the compression height.

5. The method according to claim 4, wherein, determining a compression width according to the compression height comprises:

obtaining a width of the image to be compressed;

calculating a second ratio of the compression height to the height of the image to be compressed; and taking a product of the second ratio and the width of the image to be compressed as the compression width.

6. A mobile terminal, comprising a housing, a processor, a memory, a circuit board and a power source circuit, wherein, the circuit board is arranged inside a space surrounded by the housing, the processor and the memory are set on the circuit board; the power source circuit is configured to provide power for each circuit or device of the mobile terminal; the memory is configured to store executable program codes; the processor is configured to read the executable program codes stored in the memory to execute a program corresponding to the executable program codes so as to perform acts of:

obtaining a height of an image to be compressed and a pixel density of a mobile terminal in which the image to be compressed stored; when the height of the image to be compressed is greater than or equal to a preset threshold and the pixel density is greater than or equal to a preset pixel density, further obtaining a display height of the mobile terminal and calculating a first height of the image to be compressed according to the display height and the pixel density of the mobile terminal; and determining a compression height for compressing the image to be compressed according to the preset threshold and the first height;

wherein the processor is further configured to execute the program corresponding to the executable program codes so as to perform acts of:

when the pixel density is less than the preset pixel density, obtaining the display height of the mobile terminal and determining whether the display height is less than the preset threshold;

when the display height is less than the preset threshold, taking the preset threshold as the compression height, and compressing the image to be compressed accordingly; and when the display height is greater than or equal to the preset threshold, taking the display height of the mobile terminal as the compression height, and compressing the image to be compressed accordingly.

7. The mobile terminal according to claim 6, wherein the processor is configured to determine a compression height for compressing the image to be compressed according to the preset threshold and the first height by acts of:

determining whether the first height is less than the preset threshold;

when the first height is less than the preset threshold, taking the preset threshold as the compression height, and compressing the image to be compressed accordingly;

when the first height is greater than or equal to the preset threshold, further determining whether the height of the image to be compressed is greater than or equal to the first height; and when the height of the image to be compressed is greater than or equal to the first height, taking the first height as the compression height, and compressing the image to be compressed accordingly.

8. The mobile terminal according to claim 6, wherein the processor is configured to calculate a first height of the image to be compressed according to the display height and the pixel density of the mobile terminal by acts of:

calculating a first ratio of the preset pixel density to the pixel density of the mobile terminal; and taking a product of the first ratio and the display height of the mobile terminal as the first height.

9. The mobile terminal according to claim 6, wherein the processor is further configured to execute the program corresponding to the executable program codes so as to perform acts of:

determining a compression width according to the compression height after determining the compression height and before compressing the image to be compressed.

10. The mobile terminal according to claim 9, wherein the processor is configured to determine a compression width according to the compression height by acts of:

obtaining a width of the image to be compressed;

calculating a second ratio of the compression height to the height of the image to be compressed; and taking a product of the second ratio and the width of the image to be compressed as the compression width.

11. A non-transitory computer-readable storage medium, stored with instructions that when executed by a processor of a terminal, causing the terminal to perform a method for compressing an image, including: obtaining a height of an image to be compressed and a pixel density of a mobile terminal in which the image to be compressed stored;

when the height of the image to be compressed is greater than or equal to a preset threshold and the pixel density is greater than or equal to a preset pixel density, further obtaining a display height of the mobile terminal and calculating a first height of the image to be compressed according to the display height and the pixel density of the mobile terminal; and determining a compression height for compressing the image to be compressed according to the preset threshold and the first height;

wherein determining a compression height for compressing the image to be compressed according to the preset threshold and the first height comprises:

determining whether the first height is less than the preset threshold;

when the first height is less than the preset threshold, taking the preset threshold as the compression height, and compressing the image to be compressed accordingly;

when the first height is greater than or equal to the preset threshold, further determining whether the height of the image to be compressed is greater than or equal to the first height; and when the height of the image to be compressed is greater than or equal to the first height, taking the first height as the compression height, and compressing the image to be compressed accordingly.

12. The non-transitory computer-readable storage medium according to claim 11, wherein, after obtaining a pixel density of a mobile terminal, the method further comprises:

when the pixel density is less than the preset pixel density, obtaining the display height of the mobile terminal and determining whether the display height is less than the preset threshold;

when the display height is less than the preset threshold, taking the preset threshold as the compression height, and compressing the image to be compressed accordingly; and when the display height is greater than or equal to the preset threshold, taking the display height of the mobile terminal as the compression height, and compressing the image to be compressed accordingly.

13. The non-transitory computer-readable storage medium according to claim 11, wherein, calculating a first height of the image to be compressed according to the display height and the pixel density of the mobile terminal comprises:

calculating a first ratio of the preset pixel density to the pixel density of the mobile terminal; and taking a product of the first ratio and the display height of the mobile terminal as the first height.

14. The non-transitory computer-readable storage medium according to claim 11, wherein, after determining the compression height and before compressing the image to be compressed, the method further comprises:

determining a compression width according to the compression height.

15. The non-transitory computer-readable storage medium according to claim 14, wherein, determining a compression width according to the compression height comprises:

obtaining a width of the image to be compressed;

calculating a second ratio of the compression height to the height of the image to be compressed; and taking a product of the second ratio and the width of the image to be compressed as the compression width.

* * * * *